No. 775,838. PATENTED NOV. 22, 1904.
L. N. LYON & W. DONALDSON.
RAILROAD TICKET.
APPLICATION FILED MAR. 12, 1904.
NO MODEL.

Fig. 1.

Fig. 2.

To be presented for return ticket to Agent M.K.&P.T.Ry St Louis on or before January 31st 1904

In consideration of the reduced rate at which this ticket is sold, I agree to all its conditions, and agree to present the order, which is in cipher and attached hereto, to the ticket-agent at destination for a return passage ticket.

M.K.& P.T. Ry.
Good for one passage from Red River to Saint Louis Mo
Not good if detached M.K.& P.T. Ry
Good for one passage from Waco Texas to Red River
Not good if detached S.A.& P.A. Ry
Good for one passage from S.A.& P.A. Depot Waco to M.K.& P.T. Depot Waco Texas.
Not good if detached S.A.& P.A. Ry
Good for one passage from Central Texas to Waco Texas
Not good if detached Witnesses:
C. D. Kesler
James L. Norris, Jr.

Inventors
Leonidas N. Lyon
Westbrook Donaldson
By James L. Norris
Atty.

No. 775,838. Patented November 22, 1904.

UNITED STATES PATENT OFFICE.

LEONIDAS N. LYON AND WESTBROOK DONALDSON, OF FLATONIA, TEXAS.

RAILROAD-TICKET.

SPECIFICATION forming part of Letters Patent No. 775,838, dated November 22, 1904.

Application filed March 12, 1904. Serial No. 197,863. (No model.)

*To all whom it may concern:*

Be it known that we, LEONIDAS N. LYON and WESTBROOK DONALDSON, citizens of the United States, residing at Flatonia, in the county of Fayette and State of Texas, have invented new and useful Improvements in Railroad-Tickets, of which the following is a specification.

This invention relates to railroad-tickets; and the object thereof is to prevent the sale by the original purchaser to some other person of the return-passage portion of the ticket or at least to minimize the chances of it being sold.

Primarily the invention resides in providing the ticket with an exchange-coupon for a return-passage ticket, said coupon preferably being provided with cipher inscriptions to indicate, respectively, the railroad which issued the ticket, the station for which return-passage is desired, the route of the return-passage ticket, the station at which the order-coupon is to be presented, and for identification by the agent to which the order is presented. The cipher-inscribed exchange-coupon is substantially an order upon the ticket agent for a return-passage ticket, and the cipher incriptions thereon are such as to be unintelligible to the purchaser or any one else except the necessary railway officials, and the employment of said cipher-inscribed exchange-coupon is to prevent what is commonly known as "scalping." The scalper's principal help in being able to ply his trade is his ability to get hold of the identical ticket or an intelligent order for the same, and thereby be able to sell it to a person other than the one the railroad company intended should return on it. Return-tickets are usually sold at a reduced rate, and the scalper is able to buy the return portion for a much smaller sum than the regular rate would be and then sell them for a nominal reduction under the regular rate, thereby causing that much loss to the railroad company. The cipher-inscribed exchange-coupon for a return-passage ticket being unintelligible to the scalper, the risk he would run in purchasing one of them would be so great that no ordinarily cautious person or even one less than ordinarily cautious would or could afford to run the risk of buying them.

Therefore it is evident that by the employment of the cipher-inscribed exchange-coupon a person holding that coupon for a return-ticket could go into a ticket-scalper's office and offer to sell him the coupon, informing the scalper that it was for a return-ticket to a station a thousand miles from where the scalper is situated, and in reality the coupon would only call for a return passage to a station only twenty miles away, there being nothing on the coupon in open language to indicate where or what the return-station is, and the chances are that the scalper would not take the risk in buying the coupon.

To more clearly set forth our invention for obtaining the foregoing objects, reference is had to the accompanying drawings, forming a part of this specification, and in which—

Figures 1 and 2 illustrate, respectively, a front and back view of the ticket.

Referring to the drawings by reference characters, the ticket comprises in its construction a body portion 1, upon one face of which is printed or otherwise placed thereon a contract which is to be signed by the purchaser and reading substantially as follows: "In consideration of the reduced rate at which this ticket is sold I agree to all its conditions and agree to present the order which is in cipher and attached hereto to the ticket-agent at destination for a return-passage ticket," suitable space being arranged upon the body portion 1 for the purchaser's signature.

To one end of the body portion of the ticket is attached a passage-going coupon or coupons. For example, three passage-going coupons are shown and numbered, respectively, 2, 3, and 4, and also is shown, for example, a transfer-coupon 5 for passage from one railroad-depot to another in the same city. The number of the passage-going coupons will be increased or diminished, as occasion requires. To the other end of the body portion 1 is attached the order-coupon 6.

The passage-going coupon 2 is provided with an inscription 7 to indicate the two stations between which the coupon 2 permits the purchaser to travel, as shown, for example, "From Central Texas to Waco, Texas." The coupon 2 is also provided with a suitable inscription, as at 8, to indicate the name of the railroad over which the purchaser is traveling between the stations indicated on the coupon 2. The passage-going coupon 3 is provided with an inscription 9 to indicate the two stations between which the coupon 3 permits the purchaser to travel—for example, "From Waco, Texas, to Red River." The coupon 3 is also provided with a suitable inscription 10 to indicate the name of the railroad over which the purchaser is traveling between the stations indicated on the coupon. The passage-going coupon 4 is provided with an inscription 11 to indicate the two stations between which the coupon 4 permits the purchaser to travel—for example, "From Red River to St. Louis, Missouri." The coupon 4 is also provided with a suitable inscription 12 to indicate the name of the railroad over which the purchaser is traveling between the stations indicated on said coupon. The transfer-coupon 5 is provided with a suitable inscription 13 to indicate the depots between which the purchaser travels when being transferred from one to the other—for example, "From S. A. & P. depot, Waco, to M. K. & P. T. depot, Waco." The coupon 5 is also provided with a suitable inscription to indicate which railroad issues the coupon. The foregoing arrangement of coupons is the ordinary form employed for railroad-tickets, and is set forth to more clearly illustrate the invention in connection with the order-coupon.

The cipher-inscribed exchange-coupon 6, which, as before stated, is connected, preferably, at the upper end of the body portion 1, is provided with a cipher inscription, as at 15—for example, "817"—for indicating the railroad which issues the ticket; with a cipher inscription, as at 16—for example, "29,625"—to indicate the station for which return passage is desired; with a cipher inscription, as at 17—for example, "340"—for indicating the route of the return passage; with a cipher inscription, as at 18—for example, "283"—to indicate the date limit of the return-passage ticket, and with a cipher inscription, as at 19—for example, "1,094"—to indicate the station at which the coupon for return passage is to be presented. As shown, for the cipher inscriptions 15, 16, 17, 18, and 19 numerals are employed; but it is evident that letters can be employed instead or other suitable cipher-indicating means. The cipher inscriptions 15, 16, 17, and 18 are shown extending transversely of the coupon and the cipher inscription 19 as extending horizontally of the coupon; but it is evident that the cipher inscriptions can be arranged upon the coupon in any suitable manner. A suitable time-limit inscription is provided on the back of the coupon, as at 19.

The exchange-coupon is also provided with a cipher inscription, as at 20, which is adapted for the use of the agent to which the order is presented. The cipher inscription 20 is illustrated by the letter "A;" but it is evident that a numeral can be employed or other cipher-indicating means. Cipher inscription 20 identifies for the agent to which the coupon is presented the necessary cipher-inscription key-book of reference. The cipher-inscription key-book contains the key to the various cipher inscriptions. Preferably a cipher-inscription key-book of reference will be employed separately for each railroad, each book of reference having a different cipher-identification means; but, if desirable, but one cipher-inscription key-book of reference may be employed.

When the purchaser of the ticket presents the exchange-coupon to the ticket agent, the cipher inscription 15 will indicate to the ticket agent the railroad which issues the ticket, the cipher inscription 16 will set forth to the agent the station for which return-passage ticket is to be issued, the cipher inscription 17 will indicate to the agent the route of the return-passage ticket, the cipher inscription 18 will indicate to the agent whether the coupon is presented in time for the purchaser to receive the return-passage ticket, and the cipher inscription 19 will indicate to the ticket agent whether the order 6 is presented to the correct ticket-office. If the exchange-coupon is presented to the correct ticket-office and the time has not expired, then the ticket agent will give to the purchaser his return-passage ticket according to what is set forth by the cipher inscriptions 15, 16, and 17.

By the employment of the cipher-inscribed exchange-coupon it is extremely doubtful whether any one would take the risk in purchasing the same from the original holder, for the reason that the cipher inscriptions are unintelligible to any one except the railroad officials, and consequently the would-be purchaser would not know what he was buying. Therefore it is thought by the arrangement set forth that the scalping of tickets will be reduced to a minimum—that is to say, if a ticket is issued by a railroad company provided with the cipher-inscribed exchange-coupon.

It is thought that the many advantages of my improved railroad-ticket can be readily understood from the foregoing description, taken in connection with the accompanying drawings, and it will furthermore be evident that changes, variations, and modifications can be resorted to without departing from the spirit of the invention or sacrificing any of its advantages, and we therefore do not wish to restrict ourselves to the details of construction hereinbefore described and as set forth in the annexed drawings, but reserve the right to make such changes, variations, and modifications as come properly within the scope of the protection prayed.

Having thus fully described our invention, what we claim as new, and desire to secure by Letters Patent, is—

1. A railroad-ticket comprising a passage-going coupon, an exchange-coupon for a return passage, suitable inscriptions to indicate the character of the coupons, and said exchange-coupon provided with cipher inscriptions.

2. A railroad-ticket comprising as a part thereof, an exchange for a return passage and suitable inscriptions to indicate the character of the exchange, said exchange portion having cipher inscriptions.

3. A railroad-ticket comprising a body portion having a contract thereon for the passenger to sign, a passage-going coupon or coupons connected to one end of the body portion, and an exchange-coupon for a return passage attached to the other end of said body portion and having cipher inscriptions, said ticket further provided with suitable inscriptions indicating the character of the coupons.

4. A railroad-ticket comprising a body portion, a passage-going coupon or coupons connected to one end of the body portion, and an exchange-coupon for the return passage attached to the other end of said body portion and having cipher inscriptions, said ticket further provided with suitable inscriptions to indicate the character of the coupons.

In testimony whereof we have hereunto set our hands in presence of two subscribing witnesses.

LEONIDAS N. LYON.
WESTBROOK DONALDSON.

Witnesses:
W. WILLEFORD,
F. A. NESRSTA.